(12) United States Patent
Panchenko et al.

(10) Patent No.: US 9,147,070 B2
(45) Date of Patent: Sep. 29, 2015

(54) BINARY TRANSLATION AND RANDOMIZATION SYSTEM FOR APPLICATION SECURITY

(71) Applicant: Cisco Technology, Inc., San Jose, CA (US)

(72) Inventors: Maksim Panchenko, Mountain View, CA (US); Joe Epstein, Pleasanton, CA (US); Jan Civlin, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/964,917

(22) Filed: Aug. 12, 2013

(65) Prior Publication Data

US 2015/0047049 A1 Feb. 12, 2015

(51) Int. Cl.
*G06F 9/45* (2006.01)
*G06F 21/54* (2013.01)
*G06F 21/14* (2013.01)

(52) U.S. Cl.
CPC ............... *G06F 21/54* (2013.01); *G06F 21/14* (2013.01)

(58) Field of Classification Search
CPC .................................................. G06F 9/45508
See application file for complete search history.

(56) References Cited

U.S. PATENT DOCUMENTS

| | | | |
|---|---|---|---|
| 2008/0016314 A1* | 1/2008 | Li et al. | 711/200 |
| 2009/0254726 A1* | 10/2009 | Miller et al. | 711/163 |
| 2012/0260106 A1 | 10/2012 | Zaks et al. | |
| 2013/0091318 A1* | 4/2013 | Bhattacharjee et al. | 711/6 |
| 2014/0094315 A1* | 4/2014 | Stine et al. | 463/42 |
| 2014/0229717 A1* | 8/2014 | Venkat et al. | 712/225 |
| 2014/0283036 A1* | 9/2014 | Salamat et al. | 726/22 |
| 2015/0106872 A1* | 4/2015 | Hiser et al. | 726/1 |

OTHER PUBLICATIONS

David Hulton, "x86 Rewriting: Beating Binaries into Submission" Oct. 16, 2013, http://sandiego.toorcon.net/2013/10/07/x86-rewriting-beating-binaries-into-submission/ , 2 pages.
Wartell et al., "Sinary Stirring: Self-Randomizing Instruction Addresses of Legacy x86 Binary Code", CCS, dated Oct. 16, 2012, 12 pages.
Vasilis Pappas et al., "Smashing the Gadgets: Hindering Return-Oriented Programming Using In-Place Code Randomization", Security and Privacy, dated May 20, 2012, IEEE, 16 pages.
International Searching Authority, "Search Report" in application No. PCT/US2014/050073, dated Oct. 22, 2014, 15 pages.

(Continued)

*Primary Examiner* — Philip Wang
(74) *Attorney, Agent, or Firm* — Hickman Palermo Truong Becker LLP

(57) ABSTRACT

In one embodiment, methods are described to provide a binary translation and randomization system. Relocation metadata is received, which comprises, for each of a plurality of execution units in an executable file, a mapping from the executable file into an address space range. For at least one of the plurality of execution units, the mapping is modified to replace instructions within the address space range with a relocated copy of the instructions at a randomly located address space range. An order of the plurality of execution units may thus be modified. An image is generated from the executable file using the relocation metadata, and an execution of the image is caused. The randomization may be carried out in two passes to provide executable files that are uniquely randomized for each computer and for each execution.

18 Claims, 5 Drawing Sheets

(56) References Cited

OTHER PUBLICATIONS

Claims in application No. PCT/US2014/050073, dated Oct. 2014, 3 pages.

Chongkyung Kil et al., "Address Space Layout Permutation (ASLP): Towards Fine-Grained Randomization of Commodity Software", IEEE, PI, dated Dec. 2006, 10 pages.

Aditi Gupta et al., "Marlin: A Fine Grained Randomization Approach to Defend Against ROP Attacks" dated Jun. 3, 2013, 14 pages.

* cited by examiner

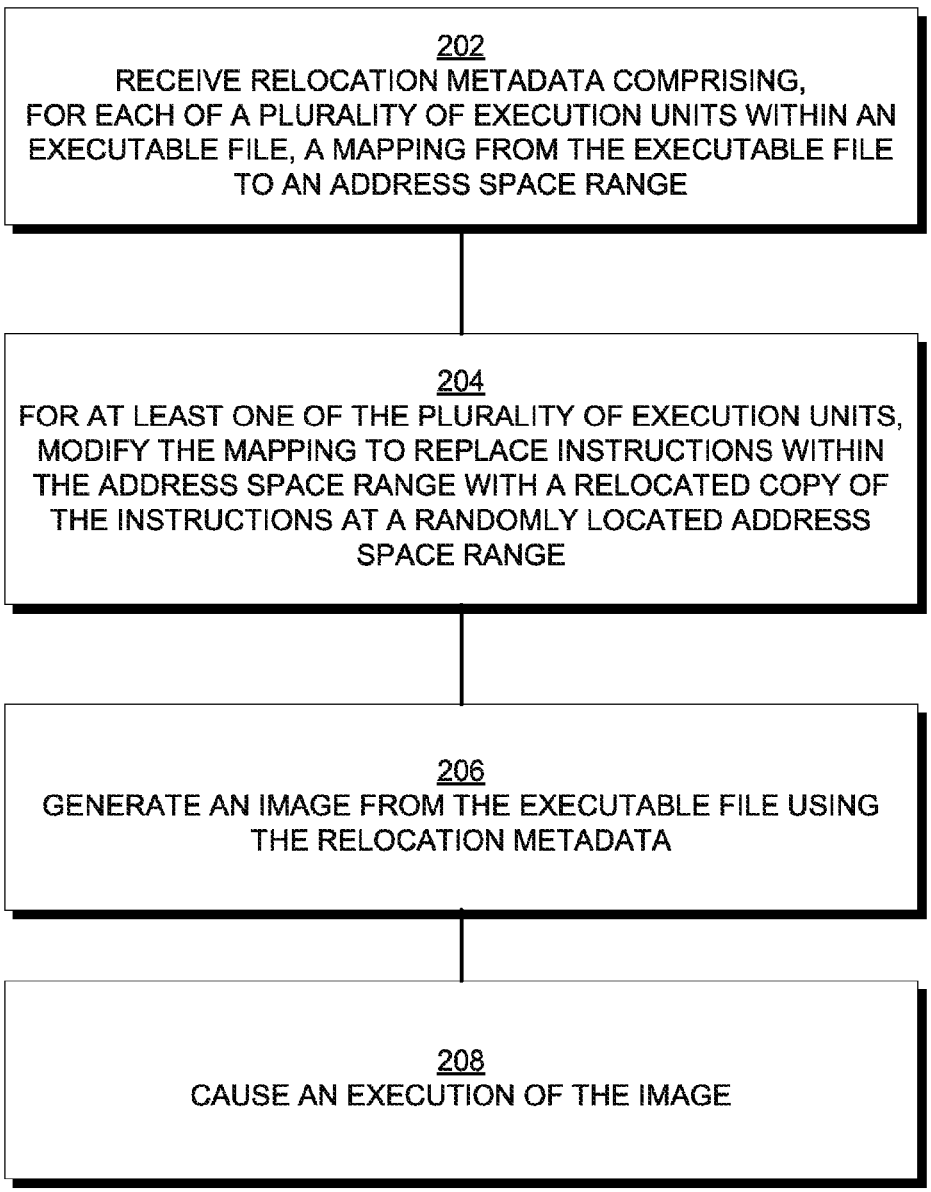

BINARY TRANSLATION AND RANDOMIZATION SYSTEM FOR APPLICATION SECURITY

TECHNICAL FIELD

The present disclosure generally relates to computer application security. The disclosure relates more specifically to techniques for modifying binary computer program images for improving application security.

BACKGROUND OF THE DISCLOSURE

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

To protect computer systems from malicious attacks that may compromise system security, it is useful to harden computer applications against exploit techniques enabling the unauthorized execution of arbitrary code. Certain classes of exploits rely on the knowledge of code and data layouts to successfully attack an application. Existing approaches to prevent these classes of exploits are only effective to a certain degree.

BRIEF DESCRIPTION OF THE DRAWINGS

In the drawings:

FIG. 2 illustrates a method for providing a binary translation and randomization system for application security;

DESCRIPTION OF EXAMPLE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 Structural Overview
   2.1 Application Attack Vectors
   2.2 Address Space Layout Randomization
   2.3 Binary Translation and Randomization System
   2.4 Two-Pass BTRS Randomization
3.0 Functional Overview
   3.1 Program Analysis
   3.2 Metadata Augmentation
   3.3 Image Randomization
4.0 Implementation Mechanisms—Hardware Overview
5.0 Extensions and Alternatives

1.0 Overview

In an embodiment, method for providing a binary translation and randomization system for application security is presented. In an embodiment, relocation metadata is received, which comprises, for each of a plurality of execution units in an executable file, a mapping from the executable file into an address space range. For at least one of the plurality of execution units, the mapping is modified to replace instructions within the address space range with a relocated copy of the instructions at a randomly located address space range. An image is generated from the executable file using the relocation metadata, and an execution of the image is caused.

In another embodiment, relocation metadata is received at a first computer. The relocation metadata comprises, for each particular execution unit among a plurality of execution units within an executable file comprising computer-executable instructions, a mapping of that particular execution unit from the executable file to an address space range, wherein the execution units are code functions or basic control blocks. For all execution units in the plurality of execution units, the mapping is modified to replace instructions within the address space range with a relocated copy of the instructions at a randomly located address space range based on using a randomization function that is unique to the first computer. An order of the plurality of execution units is thus modified. An image is generated from the executable file using the relocation metadata, and an execution of the image is caused using a second computer. A second randomization pass on the image may be carried out by the second computer prior to execution.

In other aspects, embodiments provide a computer apparatus and a computer-readable medium configured to carry out the foregoing methods.

2.0 Structural Overview

Figure 1A:
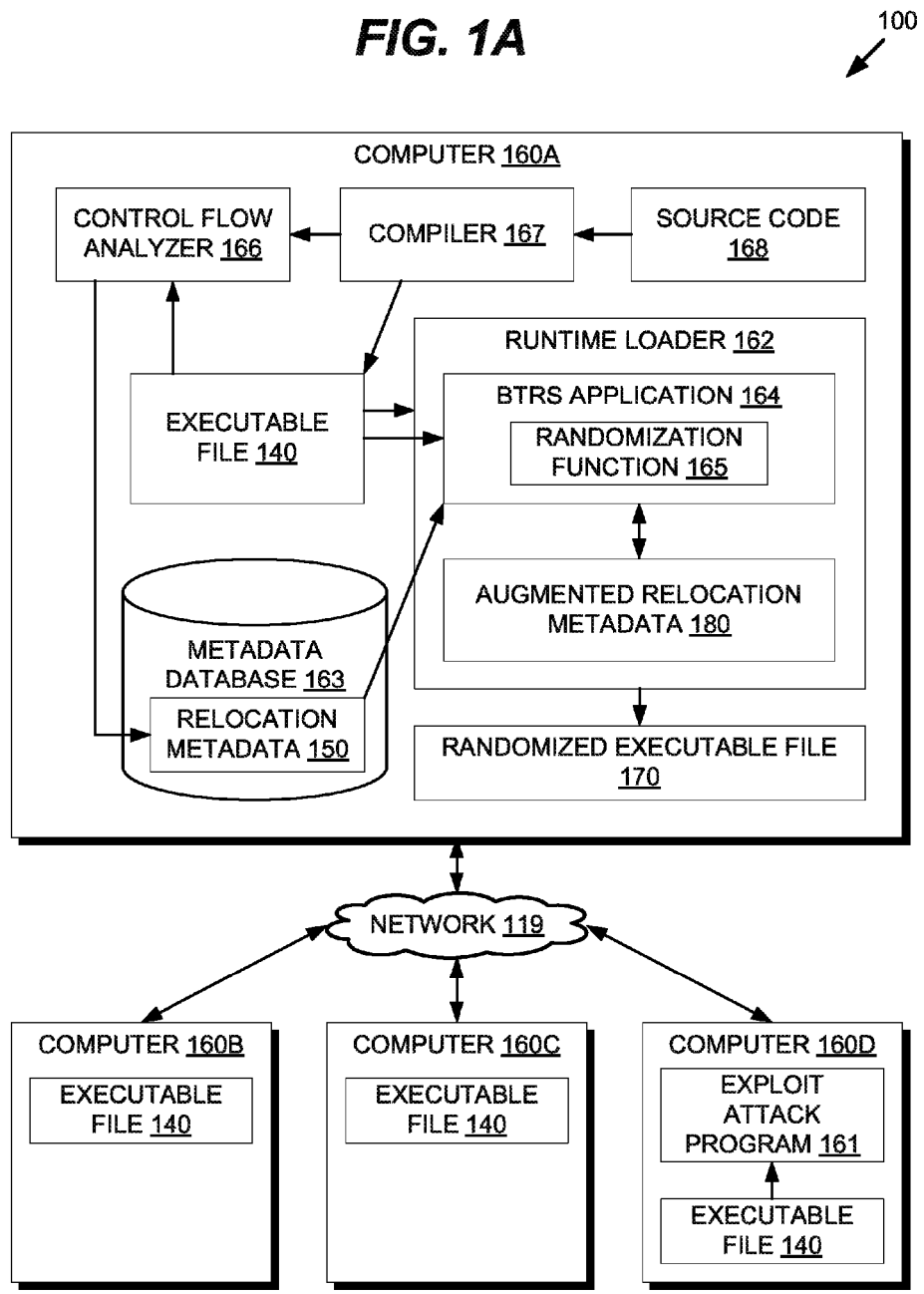
FIG. 1A illustrates an example binary translation and randomization system for application security.

FIG. 1A illustrates an example binary translation and randomization system for application security. System 100 of FIG. 1A includes computer 160A, computer 160B, computer 160C, computer 160D, and network 119. For purposes of illustrating a clear example, FIG. 1A shows four (4) computers 160A-160D, but other embodiments may be implemented in the context of networked computer systems of any size. Computer 160A includes executable file 140, runtime loader 162, metadata database 163, control flow analyzer 166, compiler 167, and source code 168. Metadata database 163 includes relocation metadata 150. Runtime loader 162 includes binary translation and randomization system (BTRS) application 164 and augmented relocation metadata 180. BTRS application 164 includes randomization function 165, which may implement a random or pseudorandom process. Computer 160B includes executable file 140. Computer 160C includes executable file 140. Computer 160D includes executable file 140 and exploit attack program 161.

Computers 160A-160D each may comprise any kind of computing device including a personal computer, workstation, server, laptop computer, netbook, tablet computer, or mobile computing device. Computers 160A-160D may also comprise specialized devices such as routers, switches, and other networking devices. Network 119 broadly represents one or more networks or internetworks.

Computers 160A-160C may run executable file 140, which comprises computer-executable instructions to provide an application, to run a service, or to perform any other task. For example, if computers 160A-160C are routers, then executable file 140 may provide network routing services. If computers 160A-160C are general purpose computers, then executable file 140 might be a web browser or a document reader. To generate executable file 140 from source code 168, compiler 167 may be utilized. Besides binary code generated from source code 168, executable file 140 may also include linked shared library functions and calls to external libraries, such as dynamic link libraries and operating system libraries, which are not specifically shown in FIG. 1A.

For simplicity, compiler 167 and source code 168 are shown to be hosted on the same computer 160A that also runs executable file 140. However, in alternative embodiments, the compiler tool-chain may be hosted on a separate development environment, in which case only the compiled end result, executable file 140, is hosted on computer 160A.

2.1 Application Attack Vectors

A malicious attacker may attempt to retrieve a copy of executable file 140 for analysis. In some cases, executable file 140 may be already freely available, for example as a pre-compiled binary download hosted on a public website. In this case, other computers, such as computers 160B and 160C, may also run the same executable file 140, and may also be potential targets for the attacker. In other cases, particularly when computer 160A is a specialized device, executable file 140 may only be hosted on computer 160A, in which case the attacker may write a firmware extraction tool, use specialized dumping and reverse engineering hardware, or otherwise devise a method of extracting executable file 140.

For purposes of an example, assume that computer 160D is a host for the attacker. Assuming a binary extraction is successful, the attacker may store a copy of executable file 140 on computer 160D. Exploit attack program 161 may then perform an assisted or automatic analysis on executable file 140 to find bugs or exploits, for example from incorrect parsing of malformed data. In the case of a routing service, executable file 140 may fail to perform a bounds check on a malformed network packet. In the case of a web browser, executable file 140 may incorrectly parse malformed web tags or scripts. In the case of a document viewer, a malformed document file may be parsed incorrectly.

Once exploit attack program 161 identifies the bug or exploit, exploit attack program 161 may proceed to generate the malformed data and attempt to induce executable file 140 running on computers 160A-160C to read the malformed data. In some cases, the malformed data may be read automatically, for example as part of normal service processing. In other cases, the malformed data must be manually read, for example by the users of computers 160A-160C navigating to a particular website or opening a particular document. In this case, social engineering attacks such as tailored e-mails or other inducement techniques can be used.

Once the bug or exploit is successfully triggered on a target computer, for example computer 160A, buffer overflows or other behaviors can be used to overwrite program memory, or more specifically the stack, to execute arbitrary code. Simplistic attacks include writing the attack payload directly into the stack and redirecting program execution to the payload address within the stack, for example by modifying a saved return address in the stack, which is later written into the processor's instruction pointer (EIP) when returning from a function call.

To prevent the stack from executing arbitrary code, many modern operating systems provide permissions mechanisms for configuring and enforcing non-executable memory pages, which may be supported at the hardware level though bits set in the page table, such as the NX (Never eXecute) or XD (eXecute Disable) bit. In Windows operating systems, this feature is called Data Execution Prevention (DEP); other operating systems may use different terminology. For OS environments that support non-executable memory pages, the stack cannot be used to directly execute a malicious payload.

New classes of attacks have been developed in response to non-executable memory pages, including return-oriented programming (ROP), where the stack can be overwritten with calls to execute existing functions and smaller chunks of the program, or "gadgets". Gadgets may perform various useful tasks such as setting the value of registers to pass parameters to functions, executing code segments, setting up control flow, and other tasks. In a ROP approach, each gadget may end with a return instruction so that the next ROP gadget can be executed.

Another class of attack is jump-oriented programming (JOP), which relies on control flow structures that already exist in the program, rather than modifying the return addresses in the stack. The identified bug or exploit may first write a sequence of branches or jumps into the heap. An initial branch is then made to a dispatcher gadget, which uses the data written in the heap for program control flow. For simplicity, both ROP and JOP shall be generally referred to as ROP in this application.

Return-to-libc is one example of an ROP attack, which calls functions in the standard C library, for example system( ) to execute an arbitrary program such as the OS shell, or mprotect( ) to modify permissions on non-executable memory pages. Return-to-libc attacks can be mitigated by using ASCII-armor addressing to remap important system libraries such as libc to have a null or 0x00 value in the address (e.g. address range 0x00000000-0x01000000 for 32 bit addresses). As a result of ASCII-armor addressing, it is harder to utilize the libc function addresses when exploiting bugs based on string functions, as the nulls in the addresses will be interpreted as a string terminator. However, other ROP attacks can circumvent ASCII-armor addressing, such as return-to-PLT/GOT (procedure linkage table/global offset table).

Given a sufficient amount of binary code to work with, which may be the case due to the various functions and shared libraries that may be compiled and linked into executable file 140, exploit attack program 161 can provide a Turing complete ROP sequence generator using only the functions and gadgets available from executable file 140, allowing any arbitrary attack payload code to be executed on a target computer by embedding a corresponding ROP sequence in the malformed data that triggers the identified bug or exploit.

2.2 Address Space Layout Randomization

ROP attacks rely on the attacker, or an attacking computer, obtaining information or knowledge about a layout of code and data in memory, as the addresses of the functions and gadgets need to be resolved to create the ROP sequences. If the same executable file 140 is used as-is on computers 160A-160C, then each of computers 160A-160C are vulnerable to the same ROP attack. Accordingly, operating systems often support the mitigating feature of address space layout randomization (ASLR), which randomizes the position of code and data segments when executable file 140 is loaded into an address space, usually virtual memory. The segments may include the executable & shared libraries, the heap, and the stack. Since the segments are loaded into different virtual memory addresses on each of computers 160A-160C, ROP attacks have a much smaller chance of succeeding for a given target, especially when using a large virtual address space as with 64-bit operating systems.

ASLR is thus effective to a certain extent, particularly when combined with non-executable memory pages, but still suffers from some drawbacks. First, for many operating system ASLR implementations, executable files must be compiled with explicit support for ASLR, which is often not the case. For example, in Linux operating systems, binary files must be compiled as a position independent executable (PIE) using the "-pie" switch. In Windows operating systems, some operating system libraries are similarly not compiled with ASLR features enabled. Furthermore, for legacy programs and libraries compiled without ASLR support, it may be difficult or impossible to obtain the source code to recompile these legacy programs and libraries with ASLR support. Accordingly, even when ASLR is available and supported, it is difficult to ensure that a given executable file or library is compiled to make use of ASLR.

Second, ASLR incurs a performance penalty due to the relocation of addresses at runtime. In particular, a heavy penalty may be incurred in hardware architectures that have a fewer number of registers available, as additional overhead may be incurred to save and restore register states to free registers for ASLR. As a result, as discussed above, many operating systems may use binaries compiled without ASLR support to provide the highest performance.

Third, even if ASLR is supported and enabled, ASLR does not protect against address leaks. Since ASLR only randomizes the starting position of code and data segments as a whole, if only one function address of a particular segment is leaked or known, then the addresses of all functions in the particular segment can be readily determined, as the ordering of the functions within the particular segment are unchanged even after ASLR is applied.

For example, a variable argument list can be passed to a string function that accepts format arguments, such as the printf function of the libc library. Due to the way these format arguments are passed, if the input to the printf function is not validated, then a specially constructed list can be used to determine the pointers to the stack frame and the return address in the stack. With the addresses of these pointers known, the addresses of the all functions in the code segment can be easily determined, and the exact location in the stack to overwrite the return address by the identified bug or exploit is also known. Accordingly, the protections of ASLR can be completely bypassed by exploiting just one address leak.

2.3 Binary Translation and Randomization System

In an embodiment, a binary translation and randomization system (BTRS) is configured to provide application security. In an embodiment, the BTRS is configured for randomizing the position of segments as a whole in virtual memory, and the ordering of execution units within code segments is also randomized. Thus, even if an address of a code segment is leaked, the ordering of the functions is no longer guaranteed to be the same, preventing the attacker from relying on a known code and data layout sequence to carry out a successful ROP attack. In various embodiments, BTRS may be used to replace ASLR completely, or BTRS may be used in combination with ASLR.

To prepare executable file 140 for use in a BTRS configuration, a corresponding relocation metadata 150 is generated using control flow analyzer 166 and/or compiler 167. The specific content of relocation metadata 150 is discussed in greater detail below under Section 3.0, Functional Overview.

Relocation metadata 150 may be stored as part of a database such as metadata database 163 in FIG. 1A. In other embodiments, relocation metadata 150 may be stored in memory, in a separate file, or appended to a non-loadable portion of executable file 140.

BTRS application 164 is thereafter invoked to randomize the order of execution units within executable file 140. BTRS application 164 may be invoked by using the runtime linker of the operating system, or runtime loader 162 as shown in FIG. 1A. However, alternative embodiments may utilize other methods to invoke BTRS application 164. For example, if the user has insufficient operating system privileges to install a modified runtime loader, then BTRS application 164 may be directly added to executable file 140 to function as an initial loader. In the case where executable file 140 is running in a virtualized environment, a hypervisor or a virtual machine monitor may invoke BTRS application 164, which may proceed in a manner that is completely transparent to the user and the virtualized guest operating system.

In an embodiment, BTRS application 164 augments relocation metadata 150 with data from the randomized order provided by randomization function 165, generating augmented relocation metadata 180. Augmented relocation metadata 180 is then used to translate executable file 140 into randomized executable file 170. While executable file 140 is randomized on a per-execution basis in FIG. 1A, alternative embodiments may randomize on a per-machine, per-user, per-customer, or other basis. After a translation of randomized executable file 170 is completed, randomized executable file 170 may then be loaded into memory for execution. In some embodiments, the randomization may be applied while the executable file 140 is being loaded into memory, and therefore a separate randomized executable file 170 may not be created.

In an embodiment, translation of randomized executable file 170 occurs in advance of execution in FIG. 1A. Thus, address translation overhead during runtime is avoided. As previously noted, ASLR may incur a heavy performance penalty during runtime, particularly on architectures with a smaller number of registers. On the other hand, a one-time address translation prior to runtime incurs a minimal performance impact, providing high performance with zero or low runtime overhead. In alternative embodiments, the address translation using randomization function 165 may be applied during runtime.

Thus, for every execution of executable file 140 at computer 160A, a newly randomized version, or randomized executable file 170, may be generated and executed in memory instead, protecting computer 160A from ROP attacks originating from exploit attack program 161, as described above. Further, while only a single executable file 140 is shown for purposes of illustrating a clear example, the BTRS configuration shown in computer 160A may protect any executable file that is run by the operating system. The BTRS configuration shown in computer 160A may be deployed in a similar manner on other computers, such as computers 160B and 160C, to provide protection for those computers as well.

2.4 Two-Pass BTRS Randomization

While the BTRS configuration described in FIG. 1A can provide a high degree of security for computers 160A-160C, each computer may remain exposed to certain types of attacks since the same executable file 140 is used as the basis of randomization for each computer. For example, since the attacker may be able to examine a binary copy of BTRS application 164, the attacker may reverse-engineer randomization function 165 and attempt to use by brute force every possible random combination of randomized executable file 170 on the target computer 160A. In the case where BTRS application 164 or randomization function 165 is available as open source, then the attacker does not even need to use any reverse engineering.

Brute force attacks may be mitigated by various defenses, for example by detecting a large number of program crashes resulting from failed exploit attempts and refusing to run new instances of executable file 140. A more difficult attack scenario is when the attacker generates an exploit targeted for one particular random combination and distributes the exploit widely. Given a large enough client install base for executable file 140, there is a high probability that at least one client will match to the same one particular random combination, allowing the exploit to work successfully. While this can be mitigated by increasing the number of random combinations possible, for example by using smaller execution units such as basic control blocks, the exploit is still likely to succeed once the client install base exceeds the number of random combinations possible.

Figure 1B:
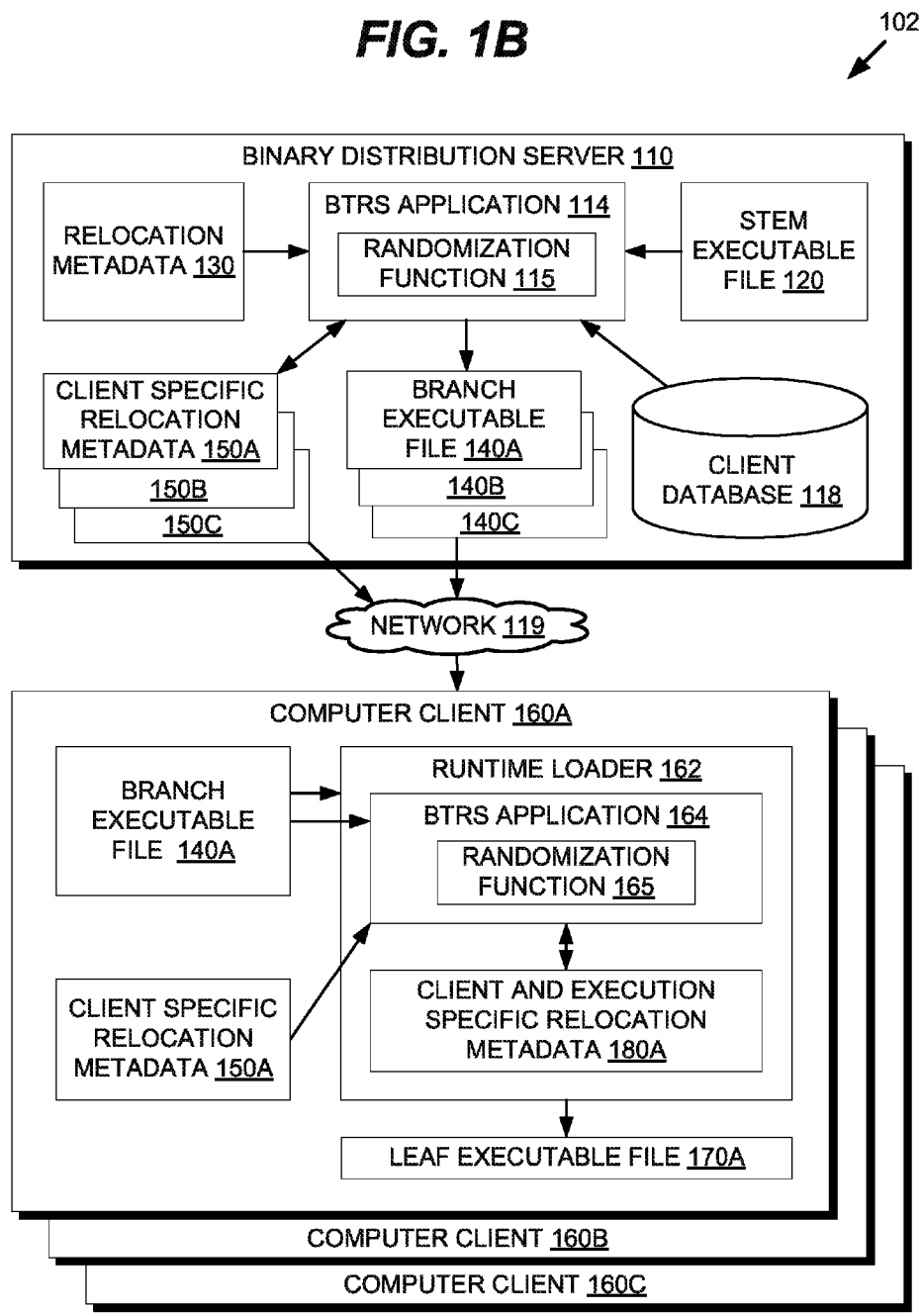
FIG. 1B illustrates an example two-pass binary translation and randomization system for application security.

In an embodiment, a multi-pass approach is used. FIG. 1B illustrates an example two-pass binary translation and randomization system for application security. System 102 of FIG. 1B includes binary distribution server 110, network 119, computer client 160A, computer client 160B, and computer client 160C. Binary distribution server 110 includes BTRS application 114, client database 118, stem executable file 120, relocation metadata 130, branch executable file 140A, branch executable file 140B, branch executable file 140C, client specific relocation metadata 150A, client specific relocation metadata 150B, and client specific relocation metadata 150C. BTRS application 114 includes randomization function 115, which may implement a random or pseudorandom process. Computer client 160A includes branch executable file 140A, client specific relocation metadata 150A, runtime loader 162, and leaf executable file 170A. Runtime loader 162 includes BTRS application 164 and client and execution specific relocation metadata 180A. BTRS application 164 includes randomization function 165. With respect to FIG. 1B, computer clients 160A-160C may be implemented similar to computers 160A-160C respectively from FIG. 1A.

Binary distribution server 110 includes a BTRS environment similar to the BTRS environment shown in computer 160A of FIG. 1A, but in the system of FIG. 1B, BTRS application 114 instead creates executable files that are randomized for specific clients. These client-specific executable files are then distributed to the respective computer clients, which also have a BTRS environment that further randomizes the client-specific executable files per execution (or by some other basis such as per-user or per-customer). The executable files can thus be considered to be organized into a tree hierarchy, with stem executable file 120 representing a top root node corresponding to the original non-randomized executable, branch executable files 140A-140C representing middle level nodes that are randomized per computer client, and leaf executable files 170A-170C representing bottom level nodes that are further randomized per execution.

A client database 118 may be maintained at binary distribution server 110 to track all clients that access binary distribution server 110, including computer clients 160A-160C. In this manner, each computer client can be uniquely identified and guaranteed a unique client key for randomization function 115. In embodiments where a client database is not maintained, other methods of generating a unique identifier may be utilized, such as deriving an identifier using any combination of client hardware serial numbers, certificates, user identifiers, license keys, network addresses, or other data.

BTRS application 114 may then proceed to augment relocation metadata 130 with data from the randomized orders provided by randomization function 115 for each client in client database 118, generating client specific relocation metadata 150A-150C. Client specific relocation metadata 150A-150C is then used to translate stem executable file 120 into branch executable files 140A-140C. The branch executable files 140A-140C and client specific relocation metadata 150A-150C may then be distributed to computer clients 160A-160C respectively over network 119, or alternatively by physical media such as optical or flash media.

Since randomization function 115 is carried out offline at binary distribution server 110, it is not subject to the same performance overhead considerations as randomization function 165, which may be restricted to lower overhead randomizations such as changing the ordering and positioning of execution units. Accordingly, more computationally intensive techniques can be utilized in randomization function 115, such as code re-generation, register re-allocation, and control flow basic block rearrangement, enabling a large increase in the number of random combinations possible for each branch executable file.

At each computer client 160A-160C, the respective BTRS environments may be configured similarly to computer 160A in FIG. 1A, providing the same benefits of high performance with low overhead. For example, with respect to computer client 160A in FIG. 1B, branch executable file 140A may correspond to executable file 140 from FIG. 1A, client specific relocation metadata 150A may correspond to relocation metadata 150 from FIG. 1A, leaf executable file 170A may correspond to randomized executable file 170 from FIG. 1A, client and execution specific relocation metadata 180A may correspond to augmented relocation metadata 180 from FIG. 1A, and other elements may correspond to the same like-numbered elements from FIG. 1A, including runtime loader 162, BTRS application 164, and randomization function 165.

Since each computer client 160A-160C starts from a respective branch executable file 140A-140C that is randomized uniquely for each client, rather than from the same executable file 140 as in FIG. 1A, no two clients will share the same initial executable file. Accordingly, an exploit that is developed for one particular branch executable file will not succeed when applied to a different branch executable file.

Moreover, randomization function 115 typically is not exposed to an attacker since BTRS application 114 is only kept on binary distribution server 110 and typically is not distributed to end users or clients. The specific processing of randomization function 115 is thus unique to binary distribution server 110 and comprises a "black box" from the viewpoint of the attacker. Unless the attacker somehow obtains a copy of the specific branch executable file for a target computer or a copy of BTRS application 114 and the client key from client database 118, the attacker cannot develop a working exploit.

Additionally, since binary distribution is centralized at binary distribution server 110, periodic or manual updates to randomization function 115 may be made, with executable file and metadata update patches pushed down to each client computer. Thus, even in the case where an attacker somehow manages to reverse engineer randomization function 115, an update can replace randomization function 115 with a new function that the attacker must newly reverse engineer. Accordingly, the two-pass BTRS environment shown in FIG.

1B can provide robust security against ROP attacks while maintaining high runtime performance of client applications.

3.0 Functional Overview

FIG. 2 is a flow diagram illustrating a method for providing a binary translation and randomization system for application security. For purposes of illustrating a clear example, FIG. 2 may be described with reference to FIG. 1A; however, the process of FIG. 2 may be used in many other arrangements and contexts.

3.1 Program Analysis

In block 202 of process 200, computer 160A receives relocation metadata 150 comprising, for each of a plurality of execution units within executable file 140, a mapping from executable file 140 to an address space range. As previously discussed, relocation metadata 150 is previously generated using control flow analyzer 166 and/or compiler 167. In the case where compiler 167 and source code 168 are available, then relocation metadata 150 may be directly derived from compiler 167, for example from a code generator and a link editor of compiler 167. If only a pre-compiled executable file 140 is available, then control flow analyzer 166 may perform a binary analysis of executable file 140 to generate relocation metadata 150. As previously discussed, relocation metadata 150 may be maintained and received from various locations such as metadata database 163, a non-loadable portion of executable file 140, or a separate file.

Figure 1C:
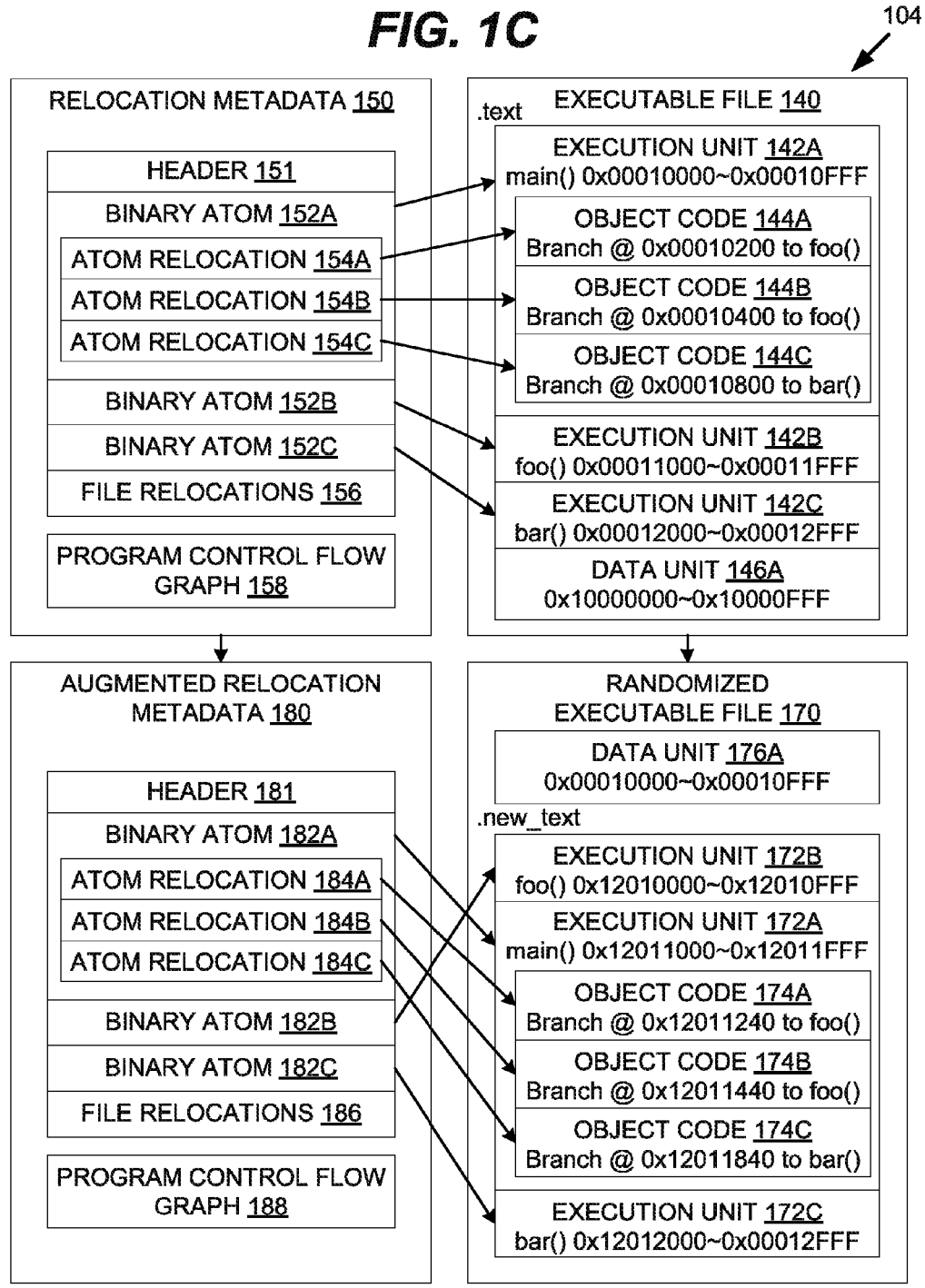
FIG. 1C illustrates example relocation metadata that is augmented by a binary translation and randomization system for application security.

To provide a specific example of the data within relocation metadata 150, FIG. 1C illustrates example relocation metadata that is augmented by a binary translation and randomization system for application security. Diagram 104 of FIG. 1C includes executable file 140, relocation metadata 150, randomized executable file 170, and augmented relocation metadata 180. Executable file 140 includes execution unit 142A, execution unit 142B, execution unit 142C, and data unit 146A. Execution unit 142A includes object code 144A, object code 144B, and object code 144C. Relocation metadata 150 includes header 151, binary atom 152A, binary atom 152B, binary atom 152C, file relocations 156, and program control flow graph 158. Binary atom 152A includes atom relocation 154A, atom relocation 154B, and atom relocation 154C. Randomized executable file 170 includes execution unit 172A, execution unit 172B, execution unit 172C, and data unit 176A. Execution unit 172A includes object code 174A, object code 174B, and object code 174C. Augmented relocation metadata 180 includes header 181, binary atom 182A, binary atom 182B, binary atom 182C, file relocations 186, and program control flow graph 188. Binary atom 182A includes atom relocation 184A, atom relocation 184B, and atom relocation 184C. With respect to FIG. 1C, like numbered elements may correspond to the same elements from FIG. 1A. Additionally, while 32-bit addresses are shown in FIG. 1C, any size address space may be supported.

Turning specifically to relocation metadata 150, header 151 may provide all the information to successfully parse relocation metadata 150, including a size of relocation metadata 150 and header 151, version and file identifiers and checksums, a number of binary atoms, atom relocations, and file relocations, a virtual address offset, file offset, and size of an image deployment zone when executable file 140 is loaded into virtual memory, and other data.

As an initial step, a program control flow graph 158 may be constructed to identify the program control structures of executable file 140, thereby allowing units of executable file 140 to be identified for relocation. While program control flow graph 158 is shown as part of relocation metadata 150 in FIG. 1C, other embodiments may allocate program control flow graph 158 outside of relocation metadata 150. If data from compiler 167 is available, then program control flow graph 158 may directly identify the precise targets of indirect control flow transfer instructions in executable file 140.

If only executable file 140 is available, then control flow analyzer 166 may utilize a static binary analysis of executable file 140 to construct a conservative program control flow graph 158 that only identifies the targets of transfer instructions in executable file 140 in more general terms. Thus, in some embodiments, a precise program control flow graph 158 may be omitted from relocation metadata 150. While this may result in some redundant data in the randomized executable file image that may lead to increased memory consumption, this may still be preferable to the high processing overhead required to conduct a full dynamic binary analysis.

Regardless of how program control flow graph 158 is constructed, binary atoms 152A-152C corresponding to execution units 142A-142C of executable file 140 can be then be described using the information from program control flow graph 158. As shown in FIG. 1C, binary atom 152A points to execution unit 142A, which is mapped into virtual address range 0x00010000 to 0x00010FFF and corresponds to the main( ) function. Binary atom 152B points to execution unit 142B, which is mapped into virtual address range 0x00011000 to 0x00011FFF and corresponds to the foo( ) function. Binary atom 152C points to execution unit 142C, which is mapped into virtual address range 0x00012000 to 0x00012FFF and corresponds to the bar( ) function.

While FIG. 1C only shows virtual addresses for image data, the file offsets for image data as stored in executable file 140 are also identified by the binary atoms and the atom relocations. Additionally, file relocations 156 may establish the file offsets and thus the ordering of execution units 142A-142C within executable file 140. Further, while each execution unit 142A-142C corresponds to entire code functions in FIG. 1C, execution units may also correspond to smaller chunks of code such as control flow basic blocks.

Once the binary atoms are identified, the specific atom relocations in each binary atom are also identified. For example, as shown in binary atom 152A, there are three code locations that may potentially require relocation updates, or atom relocations 154A-154C pointing to object code 144A-144C respectively. Object code 144A-144C may include subroutine calls or branch instructions to the foo( ) foo( ), and bar( ) functions at respective virtual addresses 0x00010200, 0x00010400, and 0x00010800. If the ordering of execution units 142A-142C is modified, then the subroutine calls in object code 144A-144C would also need to be modified to point to the correct addresses that reflect the changed ordering.

Thus, each atom relocation 154A-154C may identify 1) an offset into the atom for the unit being modified, or 0x200, 0x400, and 0x800 for the branch instructions at respective object code 144A-144C into execution unit 142A, 2) the atoms being referenced for relocation, or the foo( ) foo( ) and bar( ) functions located at respective execution units 142B, 142B, and 142C, 3) the method by which the references are encoded, such as absolute or relative and the number of bits to modify, and 4) any other information, such as addends. File relocations 156 may reference atoms in a similar manner, but for modifying units that are not contained inside any atom, where the 1) offset is always with reference to executable file 140.

While FIG. 1C only shows a list of atom relocations for binary atom 152A, it should be noted that binary atoms 152B-152C may also include lists of atom relocations for corresponding object code. Moreover, while the list of binary atoms in relocation metadata 150 is shown to be a single level list, other embodiments may nest binary atoms within binary atoms to form a hierarchy of code blocks. This may allow BTRS application 164 to balance performance versus security by applying randomization at the most appropriate code block granularity level. Accordingly, while binary atom 152A only references object code in a single atom, or execution unit 142A, other embodiments may include atom relocations that reference other atoms; for example, atom relocation 154B could instead reference execution unit 142C.

Thus, control flow analyzer 166 may analyze each of execution units 142A-142C in executable file 140 to identify the atom relocations for each corresponding binary atom 152A-152C, which may be provided from binary analysis or from relocation metadata that is already present in executable file 140. Alternatively, compiler 167 may provide the atom relocations directly. As a result, relocation metadata 150 is now complete and may be stored in memory or disk, such as in metadata database 163, ready for receiving. In the case of FIG. 1A, the operating system may request an execution of executable file 140, which automatically invokes runtime loader 162. BTRS application 164 may then receive relocation metadata 150 by querying metadata database 163 for the metadata associated with executable file 140.

3.2 Metadata Augmentation

In block 204 of process 200, for at least one of execution units 142A-142C, BTRS application 164 modifies the corresponding mapping of binary atoms 152A-152C to replace the instructions within the address space range with a relocated copy of the instructions at a randomly located address space range. Thus, block 204 applies randomization function 165 to randomize the mapping of at least one of the binary atoms 152A-152C. Relocation metadata 150 is updated accordingly and written as augmented relocation metadata 180.

In the example shown in FIG. 1C, the mapping of all three binary atoms 152A-152C is randomized. The mapping of execution unit 142A or main( ) into virtual addresses 0x00010000 to 0x00010FFF by binary atom 152A is randomized into the new mapping of binary atom 182A, which maps a relocated execution unit 172A into virtual addresses 0x12011000 to 0x12011FFF. The mapping of execution unit 142B or foo( ) into virtual addresses 0x00011000 to 0x00011FFF by binary atom 152B is randomized into the new mapping of binary atom 182B, which maps a relocated execution unit 172B into virtual addresses 0x12010000 to 0x12010FFF. The mapping of execution unit 142C or bar( ) into virtual addresses 0x00012000 to 0x00012FFF by binary atom 152C is randomized into the new mapping of binary atom 182C, which maps a relocated execution unit 172C into virtual addresses 0x12012000 to 0x12012FFF.

As a result, it can be seen that the ordering of the execution units 142A-142C is changed from 1) main( ), 2) foo( ), and 3) bar( ) to 1) foo( ), 2) main( ), and 3) bar( ) in the ordering of execution units 172A-172C, as reflected by binary atoms 182A-182C. Moreover, the starting address of the code segment ".text" at 0x00010000 is relocated to the code segment ".new_text" at 0x12010000. The position of the data segment, or data unit 146A, is moved from 0x10000000 to 0x00010000 in data unit 176A, which may be reflected by file relocations 156 and 186.

The ordering of the segments in virtual memory may be mirrored in the ordering of the segment images as stored in randomized executable file 170, as reflected in file relocations 186 of augmented relocation metadata 180. While execution units 172A-172C may be stored directly adjacent to each other in randomized executable file 170, binary atoms 182A-182C may map execution units 172A-172C to page-aligned addresses in virtual memory. However, the start addresses of the execution units may be offset from the start of the page to provide additional entropy.

Note that while execution units 172A-172C are all consolidated into a single ".new_text" code segment in the mappings of augmented relocation metadata 180, alternative embodiments may place the execution units into separate code segments, up to a maximum separation of one code segment per execution unit. Each of these code segments may then be placed in random page-aligned start addresses in the virtual address space, providing even higher levels of entropy. Empty pages may also be inserted into code segments for more entropy. Unused page areas may be replaced with single-byte instructions such as INT 3 instead of NOP to prevent the use of NOP slides.

For additional security, it may be desirable to randomize the location of data that reference locations to addresses in the execution units. A non-exhaustive list of such data includes switch tables, function pointers, VTBL, PLT, and GOT. This data randomization can help to prevent attacks such as return-to-PLT/GOT. One approach is to identify the location of such data using heuristics or information from compiler 167, and relocating the data to randomly positioned data segments in virtual memory, which may be reflected in file relocations 186. These data segments may also be marked as read-only segments to prevent code execution, as compiler 167 may typically place data that reference locations to code in read and execute pages. Furthermore, since this separation into code segments and read-only data segments removes any need to read reference data from the code segments, the code segments can be marked as execute-only to disallow read operations on the code segments, providing further security against malicious read attempts. This approach provides the highest performance as no runtime overhead is introduced.

In the case where only executable file 140 is available, relying on heuristics alone may be undesirable. In this case, code in randomized executable file 170 that performs control transfers using data references to code may be replaced with lookup functions that use a lookup table placed in a randomly positioned data segment, which may be marked as a read-only segment to prevent code execution. While this alternative approach adds some runtime overhead, the lookup functions may be able to detect attack attempts that jump to invalid addresses, and any potential lookup table address leaks cannot be used in the context of direct control transfer. Thus, this approach may provide even higher security.

3.3 Image Randomization

In block 206 of process 200, BTRS application 164 generates an image, or randomized executable file 170 from executable file 140 using augmented relocation metadata 180. Since the majority of the analysis work was already carried out in blocks 202 and 204, block 206 is a relatively straightforward relocation process, fixing control flow instructions and writing data to the proper positions as dictated by augmented relocation metadata 180. For example, object code 174A-174C will be patched to branch to the correct addresses for the randomly repositioned foo( ) function at 0x12010000 and the randomly repositioned bar( ) function at 0x12012000. Other data structures such as the dynamic symbol table, exception tables, and optional debugging information may also be updated in randomized executable file 170 according to augmented relocation metadata 180. Relocation metadata may be written into randomized executable file 170 to specify the static virtual addresses that will be used for the code and data segments.

In block 208 of process 200, BTRS application 164 causes an execution of randomized executable file 170, for example by passing control back to runtime loader 162 to load randomized executable file 170 instead of executable file 140. In some embodiments, execution may be deferred until a second pass of BTRS randomization occurs, as in FIG. 1B.

4.0 Implementation Mechanisms—Hardware Overview

Figure 3:
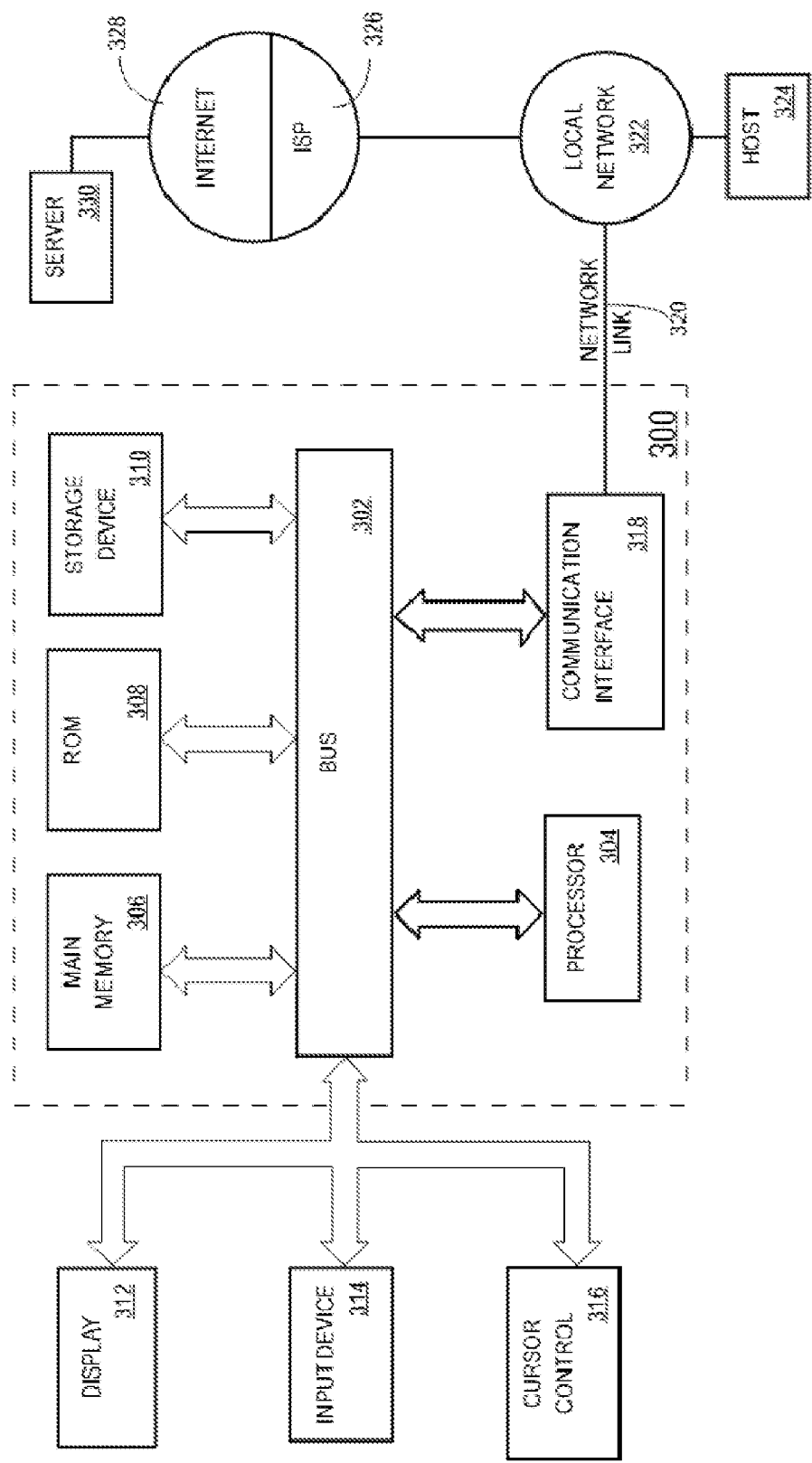
FIG. 3 illustrates a computer system upon which a method for providing a binary translation and randomization system for application security may be implemented.

FIG. 3 is a block diagram that illustrates a computer system 300 upon which an embodiment of the disclosure may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The disclosure is related to the use of computer system 300 for the techniques and functions described herein in a network system. According to one embodiment of the disclosure, such techniques and functions are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the disclosure. Thus, embodiments of the disclosure are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with embodiments of the disclosure, one such downloaded application provides for the techniques and functions that are described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

Any appropriate protocol and mechanism can be adopted to implement the disclosure. The method steps set out can be carried out in any appropriate order and aspects from the examples and embodiments described juxtaposed or interchanged as appropriate.

What is claimed is:

1. A data processing method comprising:
   receiving, at a first computer, relocation metadata comprising, for each particular execution unit among a plurality of execution units within an executable file comprising computer-executable instructions, a mapping of that particular execution unit from the executable file to an address space range;
   wherein the execution units are code functions or basic control blocks;
   for all execution units in the plurality of execution units, modifying the mapping to replace instructions within the address space range with a relocated copy of the instructions at a randomly located address space range based on using a randomization function that is unique to the first computer, and including modifying an order of the plurality of execution units;
   generating an image from the executable file using the relocation metadata;
   causing an execution of the image using a second computer;
   wherein the method is performed by one or more computing devices.

2. A data processing method comprising:
   receiving, at a first computer, relocation metadata comprising, for each of a plurality of execution units in an executable file, a mapping from the executable file into an address space range of computer memory;
   using the first computer, for at least one of the plurality of execution units, modifying the mapping to replace instructions within the address space range with a relocated copy of the instructions at a randomly located address space range in the computer memory, wherein the randomly located address space range is based on using a randomization function that is unique to one of a user that owns the image or a machine that executes the image;
   using the first computer, generating an image in the computer memory from the executable file using the relocation metadata;
   causing an execution of the image using a second computer.

3. The data processing method of claim 2, wherein the plurality of execution units are code functions or basic control blocks.

4. The data processing method of claim 2, wherein the modifying further includes modifying an order of the plurality of execution units.

5. The data processing method of claim 2, wherein the modifying further includes code re-generation or register re-allocation for at least one of the plurality of execution units.

6. The data processing method of claim 2, wherein the modifying further includes mapping the plurality of execution units to a plurality of code segments.

7. The data processing method of claim 2, wherein the executable file includes data that references an address in the plurality of execution units.

8. The data processing method of claim 7, wherein the relocation metadata further includes a data mapping, for the data that references the address in the plurality of execution units, into an data address space range, and further comprising, prior to the generating:
   modifying the data address space range to a randomly located address space range.

9. The data processing method of claim 7, wherein the image includes a lookup table placed in a randomly located address space range, wherein the lookup table is used to lookup the address in the plurality of execution units by using a lookup function.

10. The data processing method of claim 7, wherein the data that references the address in the plurality of execution units includes one of a procedure linkage table (PLT), a global offset table (GOT), a switch table, a function pointer, or a virtual method table (VTBL).

11. The data processing method of claim 2, wherein the method is performed by a runtime loader of an operating system in response to a request to execute the executable file by the operating system.

12. The data processing method of claim 2, wherein the method is performed by a hypervisor in response to a request to execute the executable file by a virtualized operating system.

13. The data processing method of claim 8, wherein the relocated copy of the instructions includes a code segment that references the data address space range, and wherein the code segment is marked as execute-only.

14. The data processing method of claim 2, wherein the relocation metadata is received from one of a compiler of the executable file or a static binary analysis of the executable file.

15. A binary translation and randomization system comprising one or more computing devices configured to:
- receive relocation metadata comprising, for each of a plurality of execution units in an executable file, a mapping from the executable file into an address space range;
- for at least one of the plurality of execution units, modify the mapping to replace instructions within the address space range with a relocated copy of the instructions at a randomly located address space range, wherein the randomly located address space range is based on using a randomization function that is unique to one of a user that owns the image or a machine that executes the image;
- generate an image from the executable file using the relocation metadata;
- cause an execution of the image.

16. The binary translation and randomization system of claim 15, wherein the plurality of execution units are code functions or basic control blocks.

17. The binary translation and randomization system of claim 15, wherein the modifying is further configured to modifying an order of the plurality of execution units.

18. The binary translation and randomization system of claim 15, wherein the receiving is in response to a runtime loader of an operating system receiving a request to execute the executable file by the operating system.

* * * * *